United States Patent Office.

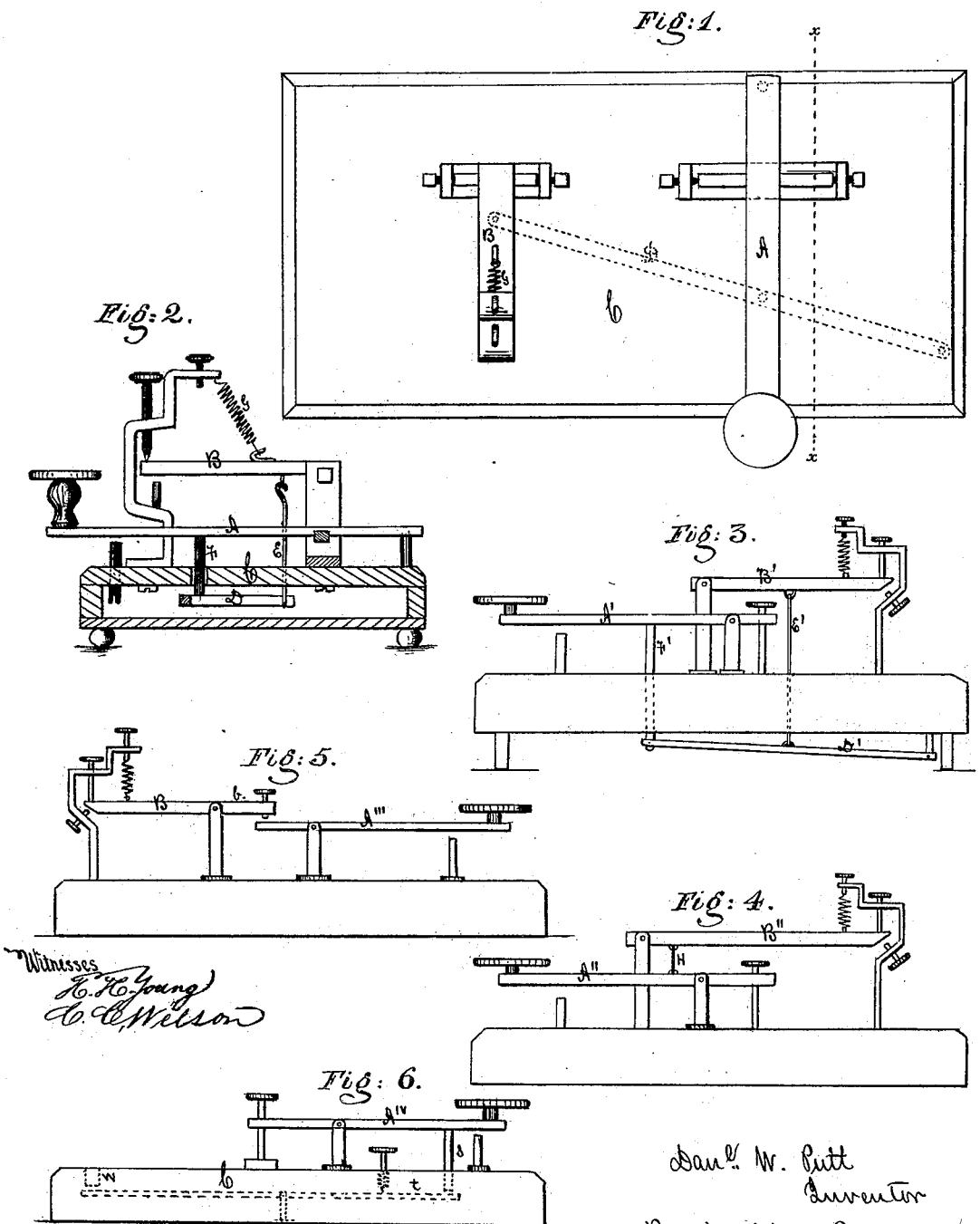

DANIEL W. PUTT, OF WELLSVILLE, OHIO, ASSIGNOR TO HIMSELF, WALTER G. BROWNSON, AND PHILIP BREWER, OF SAME PLACE.

*Letters Patent No. 103,654, dated May 31, 1870.*

IMPROVEMENT IN APPARATUS FOR TEACHING STUDENTS THE USE OF TELEGRAPHIC INSTRUMENTS.

The Schedule referred to in these Letters Patent and making part of the same.

I, DANIEL W. PUTT, of Wellsville, in the county of Columbiana and State of Ohio, have invented a new and useful Mechanical Telegraph Apparatus for Students, of which the following is a specification.

My invention relates to the combination of sounding mechanism with an ordinary telegraph-key, for the purpose of producing, by the operation of the key in the usual manner, all the sound signals of magneto-electric telegraph apparatus, without the use of magnets or batteries, the object of my invention being to furnish a simple instrument upon which students may learn the code or manual of telegraphic-signal manual, and practice the same without incurring the expense of costly instruments and batteries.

Figure 1 is a plan view of a complete form of my apparatus in its most perfect form, having a telegraphic key and sounder both of the same description, and arranged in the same manner as are those employed in telegraph-offices for regular work.

Figure 2, a transverse section in the line $x\ x$ of fig. 1, illustrating the mechanical contrivance whereby the sounder is made to operate.

Figures 3, 4, 5, and 6 are diagrams in elevation, illustrating various modifications in the construction and arrangement of my apparatus, fig. 6 representing one of its simplest forms, the ordinary sounder being dispensed with, and a key alone employed.

A, figs. 1 and 2, is a regular telegraphic key, of any approved form and construction.

B, a regular telegraphic sounder-instrument, likewise of the ordinary approved form.

C, a board upon which the key and sounder are secured, side by side, in the usual manner, as for use upon a telegraphic circuit, which forms the top of a hollow stand or casing, concealing the operating lever of the apparatus.

D, a lever pivoted at one end of the board C, on its under side, and extending thence diagonally across under the long arm of the key, to a point under the sounder, near its pivot-axis, as illustrated by dotted lines in fig. 1.

E, fig. 2, is a link connecting the sounder-lever with the free end of the lever D, and F, fig. 2, a rod connecting the key with the same lever.

The sounder-lever B (and with it the end of its attached operating lever D) is upheld by means of a spring G, attached thereto in the usual manner.

By pressure upon the key A the lever D is forced down, carrying with it the sounder-lever B, which, so soon as pressure is removed from the key, will be thrown up again by the spring G in the usual manner.

The tension of this spring is adjusted by means of a set-screw, H, and the movements of the sounder-lever controlled by a set-screw, K, as in ordinary instruments.

The apparatus presents outwardly the appearance of an ordinary telegraphic apparatus, and, by the substitution of a lever, C, for the magnets and electric circuits of a telegraph, precisely the same movements of the sounder are obtained by the operation of the key in the one as in the other, and a student may learn and practice signals upon the one with as great facility and ease, and to the same advantage as upon the other.

Diagram fig. 3 represents the key and sounder, placed in a somewhat different position upon the board, to accommodate them to a change in the arrangement and combination of the operative lever therewith.

In this apparatus the lever is pivoted at one end as before, to the under side of the board C, and so placed as that its free end shall extend to a point beneath the key A', to which it is connected by a rod, F'.

The sounder B' is also connected thereto centrally by a link, E'.

The operation of this form of apparatus is the same as in the apparatus shown in figs. 1 and 2, change being made simply in the arrangement and combination of the operative lever D.

Fig. 4 illustrates a form of my apparatus in which the employment of a concealed lever, C, is dispensed with, one end of the key A" being made to pass under the sounder B", so as to be connected directly thereto by a link, H.

The movements of the key are thus communicated directly to the sounder.

Fig. 5 illustrates a modification of the apparatus shown in fig. 4, the key A'" being so placed as that its end shall strike an end, $b$, of the sounder-lever, projecting beyond its axis, and thus impart thereto its own movement.

Fig. 6 illustrates my apparatus when so constructed as that the sounder shall be wholly dispensed with.

In this apparatus the key $A^{iv}$ is made to strike, by means of a connecting-rod, $s$, one end of a centrally-pivoted lever, and concealed in the stand C, upon which the key is placed, the other end of the lever being arranged to strike against an anvil, W, so as to produce the sound-signals under the operation of the key.

It is evident that very many equivalent devices may be employed for thus operating the sounder-lever by the movements of the key, or otherwise producing the telegraphic sound-signals without the aid of electric batteries and magnets, and it is not necessary that I shall enumerate them here.

I claim as my invention—

A telegraphic-signal apparatus for students' use, operated by a telegraphic key of the ordinary form, and constructed and arranged substantially as herein set forth, to produce the telegraphic sound-signals by mechanical appliances alone, without the use of electric batteries or magnets.

Witness my hand to this specification this 9th day of March, 1870.

D. W. PUTT.

Witnesses:
J. FISHER,
W. H. RILEY.